R. J. BROUGH.
RAKER TOOTH SWAGER.
APPLICATION FILED NOV. 11, 1907. RENEWED FEB. 21, 1911.
1,091,801. Patented Mar. 31, 1914.
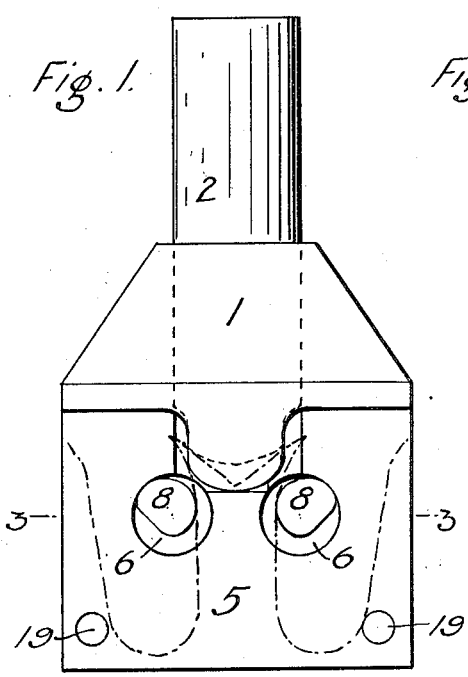
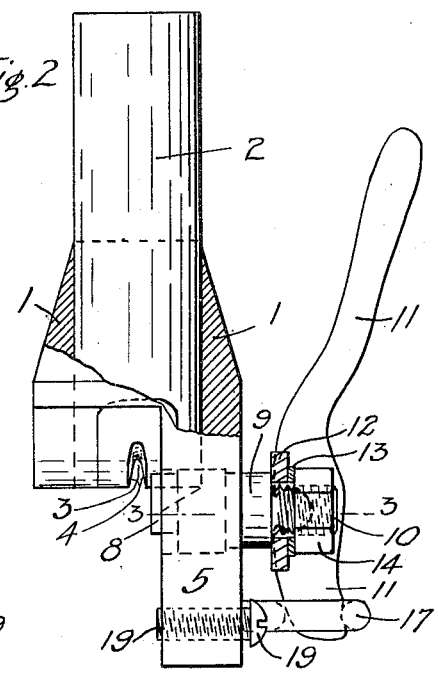
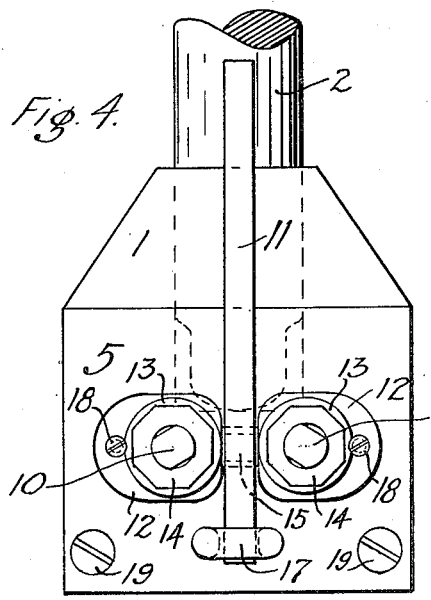
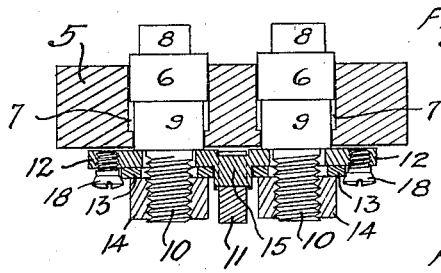
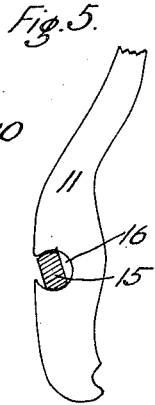
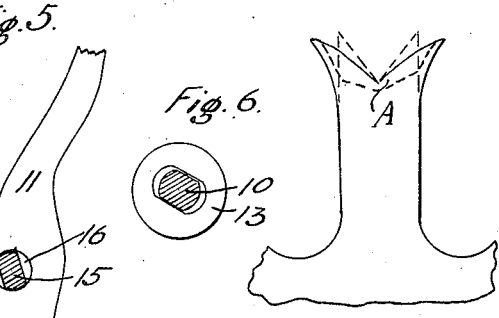
Witnesses
Inventor
Robert J. Brough
By
Attorney

UNITED STATES PATENT OFFICE.

ROBERT J. BROUGH, OF TACOMA, WASHINGTON.

RAKER-TOOTH SWAGER.

1,091,801. Specification of Letters Patent. Patented Mar. 31, 1914.

Application filed November 11, 1907, Serial No. 401,563. Renewed February 21, 1911. Serial No. 609,994.

*To all whom it may concern:*

Be it known that I, ROBERT J. BROUGH, a citizen of the Dominion of Canada, residing at Tacoma, in the county of Pierce and State of Washington, have invented certain new and useful Improvements in Raker-Tooth Swagers, of which the following is a specification, reference being had therein to the accompanying drawing.

This invention relates to devices for swaging the planing teeth of cross-cut saws and has for its object to produce and maintain, by means of swaging, planer teeth of such shape that they cut shavings from the bottom of the kerf, instead of breaking up the wood into saw-dust, thus keeping the kerf clean and enabling the saw to do more efficient work as none of its energy is applied to breaking up the wood. I attain this object by the devices and mechanism illustrated in the accompanying drawing, in which;

Figure 1 is a front elevation of my swager; Fig. 2 is a side elevation thereof; Fig. 3 is a horizontal section thereof on the lines 3—3 in Figs. 1 and 2; Fig. 4 is a rear view thereof; Fig. 5 is a side view of a part of the handle; Fig. 6 is a plan of the clamping washer; and Fig. 7 is a view showing the shape of the swaged planer tooth.

Similar numerals of reference refer to similar parts throughout the several views.

This device is designed to change the shape of a raker tooth from that shown in dotted lines (Fig. 7) to that shown in full lines in Fig. 7 without in any manner injuring its cutting points or taking any metal from the tooth, and also to restore worn teeth to their proper shape. The object is accomplished by compressing the metal along the inner edges of the V-shaped part of the tooth thus lengthening the said edges and pushing the points outward so that its outer edges will be curved as shown in said Fig. 7, and this compressing action takes place within the area marked "A" in said figure. The object in forming a planer tooth in the above mentioned shape is to make a tooth which shall coact with the kerf side-cutting teeth and shall plane out all the wood on the bottom of the kerf, and shall so act on the wood as to prevent the saw from having either a jumping action on the wood or digging too deeply in the wood, and which will truly cut the wood in conjunction with the other teeth. Since the metal out of which the saw teeth are made is of a very high and fine degree of temper and since the prongs are to be radically bent by the blows of the hammer it is necessary that great care be exercised both in the design, construction and operation of my device. The swage block is made preferably in two pieces 1 and 2, the part 1 forming the body of the swager and the part 2 being the actual swaging tool which receives the blow of the hammer and transmits it to the double inwardly-acting compressing wedges formed thereon which engage and squeeze the inner edges of the V-shaped part of the tooth. The effect of the blow is twofold, first the prongs are sprung thereunder and also, at the same time, the inner edges are lengthened by the sidewise compressive action of the double inwardly-acting wedges. The first effect aids the second effect while the second makes the first effect permanent so that the prongs will not return to their original position. The slot 3 of the part 2 which acts thus on the tooth is cut therein so that its center is lower than its edges and the sides 4 of this slot 3 converge toward the top of the slot to form a double inwardly-acting or squeezing wedge, and further these sides are closer together at the center than at the edges. The upper portion of the part 2 is adapted to receive the blow of the hammer. The part 2 is fitted into the part 1 very tightly so that the two form practically one piece.

The part 1 is provided with a back extension 5, rectangular in form, and carrying the bracing pins and the leveling set screws. The two bracing pins are best illustrated in Fig. 3 and are formed with main cylindrical parts 6 fitting neatly in, and adapted to slide in, the holes 7 in the part 5. They are provided with eccentric bracing lugs 8 on one end, the lugs 8 being symmetrically but oppositely formed. The lugs 8 are adapted to engage the sides of the raker tooth when the bracing pins are extended forward but to be withdrawn therefrom when the pins are in their inoperative position. In Fig. 2 the pins are shown in their inoperative position and in Fig. 3 they are shown extended forward to engage the sides of the raker tooth. The pins are also provided with cylindrical parts 9 to the rear of the parts 6 and of smaller diameter to keep them from falling out at the back of the tool, and with screw-threaded parts 10 at their rear ends. The parts 10 are flattened on two sides as illustrated in Fig. 6. The pins are operated as to their longitudinal positions by means of a handle 11 which engages a yoke 12 to which the screw-threaded parts 10 are secured through the medium of the washers 13 and the nuts 14. The connection between the handle 11 and the yoke 12 is illustrated in Fig. 5 wherein is shown a part 15, joining the two halves of the yoke, within a cavity 16 in the handle, the part 15 being partly cylindrical and partly flattened so that the handle may be disconnected therefrom when desired. The handle 11 is formed with a fulcrum part at its lower end adapted to engage under the loop 17 secured to the part 5 so that when the upper end of the handle is grasped (by the same hand holding the part 2 of the swager) the yoke will be pressed forward and the lugs 8 forced out into operative position on each side of the tooth. The pins are further adjusted as to their angular positions (so that the eccentric lugs 8 may be brought to their proper distance apart) by the washers 13 which engage the flattened parts of the screw-threaded parts 10 so that by turning the washers the pins, and therefore the lugs 8, are turned. The washers 13 are held in any desired position by means of the bevel-headed screws 18 engaging them. The nuts 14 do not prevent the rotation of the pins. The pins are illustrated in the drawings for use with a thick saw, but if a thin saw is to be swaged it will pass up higher into the swaging slot 3 so that the pins will be relatively lower. To overcome this I have so shaped the lugs 8 of the pins that, if the pins are interchanged, the bearing points of the lugs will come much higher than in the position illustrated and therefore in about the same relative position with regard to the tooth being swaged. The set screws 19 in the corners of the part 5 are adapted to be screwed in or out from the said part 5 so that their ends will engage the saw being swaged and will keep the tool part 2 vertical so that the blow thereon will not bend the tooth sidewise.

My invention is operated as follows: The saw being properly supported so that its teeth are uppermost and are vertical, the swager is placed with the slot engaging the inner sides of the prong. Then (the lugs 8 having been properly adjusted) the handle 11 is drawn up to the part 2 and the lugs 8 are brought to each side of the tooth just below the point where the prongs are to be bent. Then the part 2 is given a few blows with a suitable hammer, the handle 11 is released and withdraws the lugs 8 from the tooth, and the swager is lifted off the tooth. As a rule about four to six firm but not too heavy blows of the hammer will be sufficient to bend the prongs into the desired positions.

Having described my invention, what I claim is:

1. In a mechanism for swaging double pointed raker teeth, a swaging die having a slot formed with an end wall convexly rounded longitudinally, the side walls of the slot converging toward the end wall.

2. In a mechanism for swaging double pointed raker teeth, a swaging die having a slot formed with an end wall convexly rounded longitudinally, the sides of the slot converging inward toward each other, the convergence at the middle portion of the slot being greater than at the ends of the slot whereby to engage, compress and lengthen the inner side edge of a raker tooth.

3. In a raker tooth swager, a swaging die formed with a swaging surface having upwardly and outwardly inclined sides, and bracing pins disposed one on each side of the die and opposed to the same and adapted to engage and support the side edges of the raker tooth below the part thereof being swaged by said die.

4. In a raker tooth swager, the combination with a body, of a swaging surface formed thereon, two complementary bracing pins movably mounted in said body at right angles to the swaging surface and adapted to engage each side of the raker tooth below the part thereof being swaged, and a handle engaging both of said bracing pins to move them into or out of their operative positions.

5. In a raker tooth swager, the combination with a body, of a swaging surface formed thereon, two complementary bracing pins movably mounted in said body at right angles to the swaging surface, each of said pins being eccentrically mounted and rotatably adjustable relatively to each other and adapted to engage each side of the raker tooth below the part thereof being swaged, a handle engaging both of said bracing pins to move them into or out of their operative positions, and means for holding them in their rotatably adjusted positions.

6. A saw swage having a vertically movable swaging die having a slot formed with a convexly rounded end wall providing an outwardly acting swaging surface, and means carried by the swage and coacting with said die engageable with the side edges of a saw tooth for both bracing the tooth and confining the swage with its swaging surface in proper relation to the tooth.

7. A saw swage including a movable die and complemental spaced members carried by the swage below the die and coacting with the die, said members being spaced from each other to engage the side edges of a saw tooth to brace the tooth during the swaging operation and being disposed on either side of the axis of movement of the die.

8. A swaging device for the raker teeth of saws including a die having a convexly rounded swaging groove and complemental spaced members carried by the swage coacting with and disposed opposite to said grooved face of the swaging die for engaging the opposite side edges of a saw tooth and supporting the same in opposition to the swaging die, said members being adjustable.

9. A saw swage including a die having a swaging groove and spaced rotatable members carried by the swage and disposed below and on either side of the axis of the path of movement of the swaging die and adapted to engage opposite side edges of the saw tooth and support said tooth while it is being swaged in opposition to the swaging die.

10. A saw swage including a medially disposed die having a swaging surface, supporting means carried by the swage and coacting with the swaging surface for engaging a saw tooth, said means being disposed on each side of the die and opposed to the same and being movable into and out of operative position, and means for moving the aforesaid means into and out of operative position.

11. A swage for swaging raker teeth including a longitudinally shiftable swaging die, spaced members movably supported on the swage and opposed to said die, said members being disposed one on each side of the die and adapted to engage the edge of the raker tooth, and means for simultaneously moving said members into and out of supporting position where they will engage with the side edges of the tooth.

12. A saw swage having a movable swaging die formed with a rounded swaging surface, complemental spaced tooth-supporting members carried by the swage disposed one on each side of, and opposed to, said die and adapted to engage the side edges of the saw tooth being swaged, and means for permitting said members to be adjusted relative to each other and to the swaging surface.

13. A mechanism for swaging raker teeth and including a die having a swaging surface, an eccentric member rotatably mounted and coacting with the swaging surface for engaging a saw tooth with which the swaging die engages, and means for securing the member in different rotatably adjusted positions.

14. A saw swage including a swaging die, complemental members adapted to engage the opposite side edges of a saw tooth with which the die is in engagement, said complemental members being adjustable toward or from the die, and means connecting the members to cause the same to be adjusted together.

15. A swage for raker teeth including a swaging die, complemental members coacting with the swaging die and disposed on each side of and opposed to the same, said complemental members being adapted to engage a saw tooth, means for shifting the complemental members into and out of position to engage the saw tooth, and means for permitting the members to be adjusted relatively to each other and the swaging die.

16. A device for swaging raker teeth including a die having a swaging surface, oppositely disposed tooth-supporting means opposed to the die and disposed one on each side of the same, said supporting means being shiftable into and out of position in line with the swaging die, and a lever for shifting said means into and out of such operative position.

17. A saw swage including a swaging die formed at one end with a convex swaging face, a member within which the swaging end of the die is supported, said member extending beyond and at one side of said swaging face, and a pair of complemental supporting members movable transversely through the extension and adapted to engage a saw tooth, said members being disposed laterally on each side of a line coincident with the axis of movement of the die and being opposed to the swaging face of the die, said members being movable transversely through the extension and being eccentrically disposed.

18. A saw swage formed with a swaging slot, the side walls of which converge toward the bottom of the slot to constitute a pinching angle, the said angle gradually increasing in degree from the middle portion of the slot toward each end thereof.

19. A saw swage formed with a swaging slot, the bottom wall of which is curved in the direction of the length of the slot, the side walls of the slot converging toward the said bottom wall to constitute a pinching angle, the said angle gradually increasing in degree from the middle portion of the slot toward each end thereof.

20. A mechanism for swaging double pointed raker teeth including a swaging die having a slot formed in the swaging face thereof, said slot having a convexly rounded inner end wall, the sides of the slot being convergent inwardly, a pair of spaced complemental tooth supporting members disposed on each side of the axis of movement of the said die, each of said members having the form of a pin with a head eccentric to the axis of the pin, said members being interchangeable to raise or lower the point of contact of said members with the side edges of a raker tooth.

In testimony whereof I affix my signature in presence of two witnesses.

ROBERT J. BROUGH.

Witnesses:
 E. D. HODGE,
 C. H. EVERETT.

Copies of this patent may be obtained for five cents each, by addressing the "Commissioner of Patents, Washington, D. C."